US008182020B2

(12) United States Patent
Herndon

(10) Patent No.: US 8,182,020 B2
(45) Date of Patent: May 22, 2012

(54) AERODYNAMIC TRANSFORMABLE TRUCK CAP ASSEMBLY

(76) Inventor: Brett Stuart Herndon, Little Rock, AR (US)

( * ) Notice: Subject to any disclaimer, the term of this patent is extended or adjusted under 35 U.S.C. 154(b) by 0 days.

(21) Appl. No.: 13/066,900

(22) Filed: Apr. 27, 2011

(65) Prior Publication Data

US 2011/0204672 A1    Aug. 25, 2011

Related U.S. Application Data

(63) Continuation of application No. 12/286,516, filed on Sep. 29, 2008, now abandoned.

(60) Provisional application No. 60/997,085, filed on Oct. 1, 2007.

(51) Int. Cl.
B60P 7/02       (2006.01)
B60P 3/345      (2006.01)

(52) U.S. Cl. ............... 296/100.06; 296/165; 296/26.07

(58) Field of Classification Search ............ 296/100.01, 296/100.06, 100.02, 100.15, 100.17, 100.18, 296/10, 165, 26.01, 26.07, 136.01, 136.03, 296/26.04, 136.05
See application file for complete search history.

(56) References Cited

U.S. PATENT DOCUMENTS

| 4,496,184 | A  | 1/1985  | Byrd          |
| 4,828,315 | A  | 5/1989  | Muirhead      |
| D325,366  | S  | 4/1992  | Mansberger    |
| 5,127,701 | A  | 7/1992  | Miller        |
| 5,213,390 | A  | 5/1993  | Borchers      |
| 5,335,960 | A  | 8/1994  | Benignu, Jr.  |
| 5,655,809 | A  | 8/1997  | Hutchinson    |
| 5,931,176 | A  | 8/1999  | Isler et al.  |
| 5,951,095 | A  | 9/1999  | Herndon       |
| 5,971,469 | A  | 10/1999 | Lund et al.   |
| 6,149,217 | A  | 11/2000 | Plamondon     |
| 6,663,167 | B2 | 12/2003 | Phillips et al. |
| 6,942,275 | B2 | 9/2005  | Corbett       |

Primary Examiner — Glenn Dayoan
Assistant Examiner — Melissa A Black

(57) ABSTRACT

An transformable, aerodynamic cover assembly for pickup trucks which is user switchable between a closed aerodynamic configuration and a fully deployed truck cap configuration. The aerodynamic configuration reduces vehicle wind resistance and drag, thus increasing fuel efficiency. The cover assembly, constructed of rigid materials, comprises a fiberglass aerodynamic cover supporting flexible fabric widows supported by sleeve tubes, and a flexible rear hatch supported by a hanger. Internal stanchions can be deployed to elevate and support the aerodynamic cover in the elevated position. The aerodynamic cover assembly side walls and hatch provide a space for human habitation and increased cargo hauling capacity. The aerodynamic cover is detachable from the body of the assembly for hauling oversized cargo.

4 Claims, 5 Drawing Sheets

AERODYNAMIC TRANSFORMABLE TRUCK CAP ASSEMBLY

CROSS-REFERENCE TO RELATED APPLICATION

This utility application is a Continuation application claiming priority based on my previously-filed, U.S. Utility patent application entitled "Aerodynamic Transformable Truck Cap Assembly," filed Sep. 29, 2008, Ser. No. 12/286,516, now abandoned which was in turn based upon previously-filed, U.S. Provisional patent application entitled "Aerodynamic Transformable Truck Cap Assembly," filed Oct. 1, 2007, Ser. No. 60/997,085, for which priority was claimed.

BACKGROUND OF THE INVENTION

1. Field of the Invention

This invention relates generally to truck caps and cover assemblies for pickup trucks. More particularly, this invention relates to an aerodynamic cover assembly for pickup truck beds that is user-transformable between selected configurations. Known prior art relevant to this invention can be found in U.S. Patent Class 296, subclasses 100 and 165.

2. Description of Prior Art

For several years, cover assemblies of various forms have been mounted on the beds of pickup trucks. The modern truck cap is a popular pickup truck accessory, providing a variety of functional and aesthetic advantages. Prior art cover assemblies provide a covered space for human habitation and a weatherproof storage space for cargo. A variety of colored and styled bed cover assemblies for popular pickup truck models exist.

Typical truck caps are made of rigid material, and they often are shaped somewhat "squarish," i.e., generally in the form of a rectangle. Typical prior art truck caps comprise a front wall, opposed side walls, and a rear hatch, with all four sides containing safety glass for lateral and rearward visibility. The roof portion of most truck caps either extends above or is flush with the top of the cab. Such accessories often increase aerodynamic drag, and reduced fuel economy is unfortunately typical.

However, for purposes of streamlining, an aerodynamic truck cap has a roof, which begins flush in height with the roof of the truck cab and then slopes rearward to a height approximate to that of the tailgate of the pickup truck bed. This sloping fastback roof of the aerodynamic truck cap provides much less wind resistance than a truck cap with a roof that is flush to the roof of the truck cab. The greatest benefit of an aerodynamic truck cap is in increasing the fuel efficiency of the host pickup truck. The main drawback of the aerodynamic truck cap is that, with its slope, there is a substantial loss of interior volume over that provided by a truck cap with a roof flush with the cab of the pickup. This diminishes the space for human habitation and cargo stowage in the aerodynamic truck cap over that space provided by a standard truck cap.

Both U.S. Pat. No. 4,496,184 to Byrd (1985) and U.S. Pat. No. 5,335,960 to Benignu (1994) show aerodynamic truck caps. Both of these patents show the ability to change configuration.

U.S. Pat. No. 4,496,184 to Byrd provides a truck cap which can be stored in a relatively small space and minimizes wind resistance. The Byrd patent collapses from an aerodynamic configuration to a smaller stored configuration. In the aerodynamic configuration, the Byrd patent only allows cargo to be loaded through the open tailgate space. There is no hinging of the sloped roof, which, if allowed to open and shut would provide a more utilitarian design for cargo loading and unloading. Cargo size is reduced to the square footage of the tailgate opening. The small entrance through the tailgate opening does not facilitate easy access for human habitation. There is no ventilation provided for human or domestic animal occupancy. The truck cap in the Byrd patent is made of vinyl fabric that is more apt to flutter when acted upon by aerodynamic forces experienced at sustained freeway speeds. Valuable cargo is also more vulnerable to theft when the host vehicle is left unattended.

U.S. Pat. No. 5,335,960 to Benignu provides a tent-like arrangement with an aerodynamic contour. That configuration purports to create less air drag. With a growing global demand for fossil fuels, fuel prices are increasing annually. Such a global dynamic pleads for decreasing fuel consumption. When the truck bed is used for hauling, the tonneau top is removed. If cargo is to be transported, a large portion of the assembly must be removed. The fully deployed configuration of Benignu's design can only be assumed when the host vehicle is static. Additionally, the tailgate must be lowered to complete the interior expansion of the design. Benignu's structure, except for the support frame, is made from fabric. The design is not meant to be in the expanded configuration while the host vehicle is being operated on the road in motion.

In my prior patent, U.S. Pat. No. 5,951,095 entitled "Transformable truck bed cover assembly", issued Sep. 14, 1999, I provided a transformable cover assembly for pickup trucks that was user-switchable between a low profile configuration covering the rear truck bed, and a fully deployed, camper configuration. The apparatus unfolds from a planar orientation into a pair of cooperating, stacked, generally wedge-shaped segments. The complementary segments form an inhabitable enclosure in the general form of a parallelepiped when erected. A planar deck that is foldably deployed comprises a top that ultimately covers the upper segment, and a shroud that unfolds to form a border between the adjacent, deployed segments. A foldable framework comprising a plurality of cooperating members enables foldable transformation. As the assembly deploys, it unfurls pliable, generally triangular walls at the segment sides. However, the overall configuration did not exhibit the desired reduction in wind drag necessary in today's world to maximize fuel economy.

In conclusion, I am aware of no easily removable, aerodynamic truck cap designed to reduce wind drag in one mode, to user-deploy into a convenient camping or storage mode, and which protectively enshrouds truck bed contents in either mode. Ideally, a truck cap should be made from rigid material with a hinged roof to enable easy deployment. It must provide the user with maximum space for enhanced cargo capacity, and for comfortable human habitation. An acceptable truck cap must also be weatherproof. I am aware of no such truck cap combining the attributes of reduced fuel consumption and wind drag in its compact, aerodynamic mode, while at the same time maximizing fuel economy. Furthermore, I am aware of no such analogous wind drag reducing structure that is quickly foldably transformable to an erected camping mode.

BRIEF SUMMARY OF THE INVENTION

The invention, an improved aerodynamic truck cap, is made from rigid materials and has a hinged roof. The roof can be opened from the aerodynamic configuration and elevated to a position level with the roof of the cab. The user can then select to deploy fabric sides and a fabric rear hatch from the underneath of the roof to fully enclose the aerodynamic truck cap for the hauling of cargo, or to provide a space for human habitation. In this elevated and enclosed configuration of the aerodynamic truck cap, the user can operate the host vehicle in motion even at sustained freeway speeds.

Accordingly a fundamental object of the invention is to provide an improved aerodynamic truck cap to lower wind resistance and enhance the fuel efficiency of the host pickup truck.

Another basic object is to provide greater space for human habitation and the transportation of cargo.

It is also an object to allow operation of the host pickup truck while in motion with the aerodynamic truck cap in an elevated or enclosed configuration.

Further, an important object is to provide a truck cap of the character described with durable structure to endure aerodynamic forces experienced at sustained high rates of speed.

Another object is to provide a truck bed cover assembly of the character described that can be quickly transformed between configurations.

Still further objects and advantages will become apparent from a study of the following description and the accompanying drawings.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
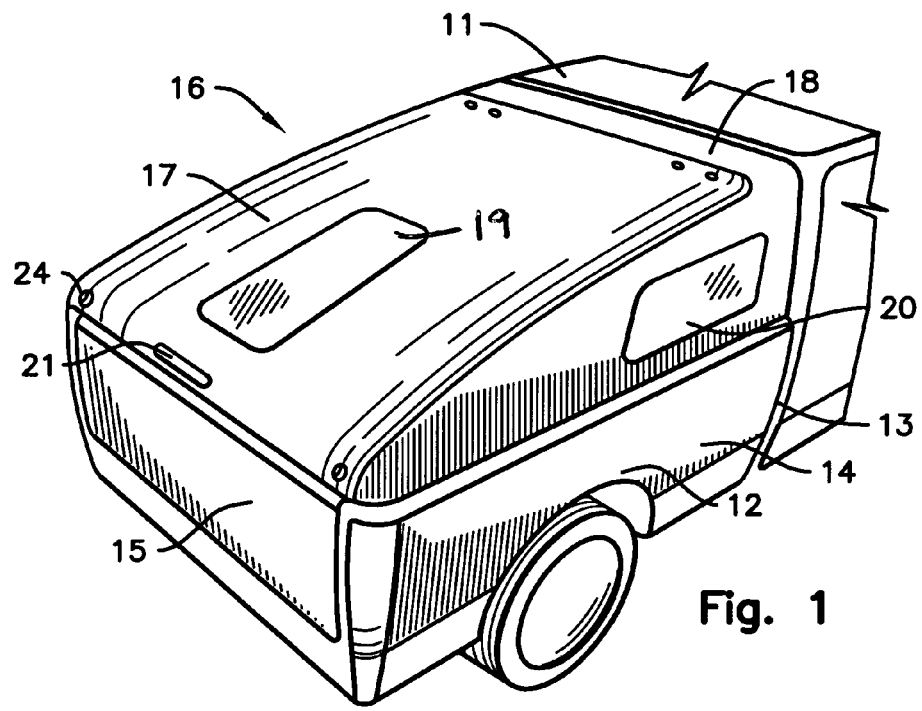
FIG. 1 is a fragmentary perspective view showing my transformable truck cap disposed in a closed, aerodynamic position mounted over a conventional pickup truck bed in accordance with the best mode of the invention.
Figure 2:
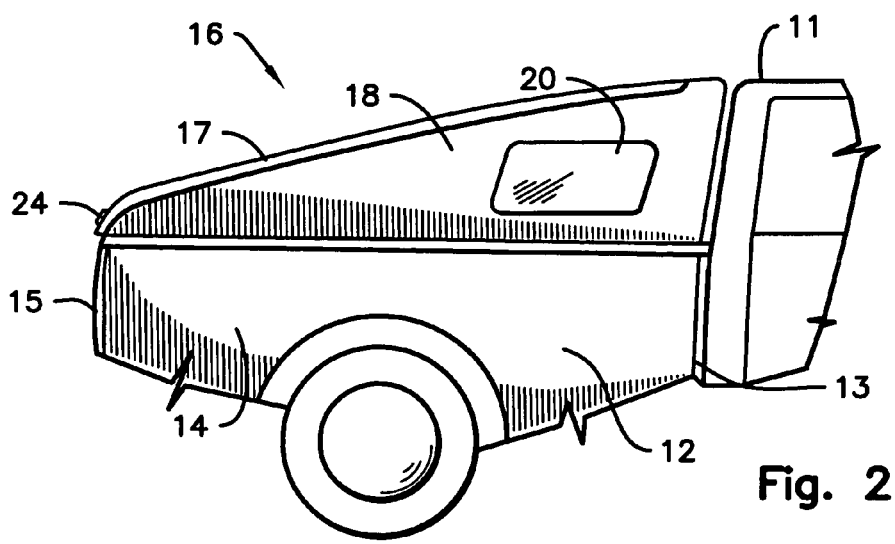
FIG. 2 is a fragmentary right side elevation view of the transformable truck cap disposed in a closed, aerodynamic position.

With initial reference directed to FIGS. 1 and 2 of the appended drawings, a conventional pickup truck having a cab 11 includes a conventional, rear truck bed 12 behind the cab 11, over and upon which my new truck cap is to be installed. The truck bed 12 is defined by upstanding front panel 13 opposite cab 11, side panels 14, and a tailgate 15. My new transformable truck cap cover assembly, constructed generally in accordance with the best mode of the invention, has been generally designated by the reference numeral 16. Assembly 16 preferably comprises an aerodynamically configured, removably mounted cover 17 operationally associated with truck cap body 18. The substantially rigid, preferably fiberglass cover 17 is disposed over bed 12, between truck side panels 14. The cover 17 may be deployed in the closed, aerodynamic position shown in FIGS. 1 and 2, it may be fully deployed in the transformed position of FIGS. 5 and 6, or it may be completely removed as in FIG. 7. During the deployment procedure between mounted configurations, cover 17 assumes an open position of FIGS. 3 and 4. Cover 17 is semi-permanently pivoted to the truck cap body 18, and it can be quickly detached or reattached as desired by the user, as explained hereinafter.

FIGS. 1 and 2 illustrate the cover assembly 16 with the cover 17 disposed in the closed, aerodynamic position, for fuel efficient travel. Cover 17 may be disposed over the truck bed, behind the cab 11, secured in part by truck cap body 18. When installed in the aerodynamic position, cover 17 assumes an inclined orientation, with its rear disposed proximate truck tailgate 15, and its front coupled to the transverse front of assembly body 18 proximate the cab 11 by hinge 33. The triangular sidewalls of body 18 gradually taper in height towards tailgate 15 (i.e., FIG. 8).

Preferably cover 17 comprises a translucent, rear window 19 (i.e., FIG. 7) for rearward visibility. The sides 18 of assembly 16 projecting between edges of cover 17 and the lower truck bed side panels 14 preferably comprise side windows 20 that enhance visibility and provide ventilation. In the best mode, cover 17 also comprises an accessory brake light 21 adapted to be operationally positioned proximate conventional tailgate 15. Light 21 is electrically interconnected with the standard truck wiring according to conventional techniques. A pair of spaced apart locks 24, preferably mounted at the rear of cover 17, secure valuable cargo within bed area beneath cover assembly cover 17.

Figure 3:
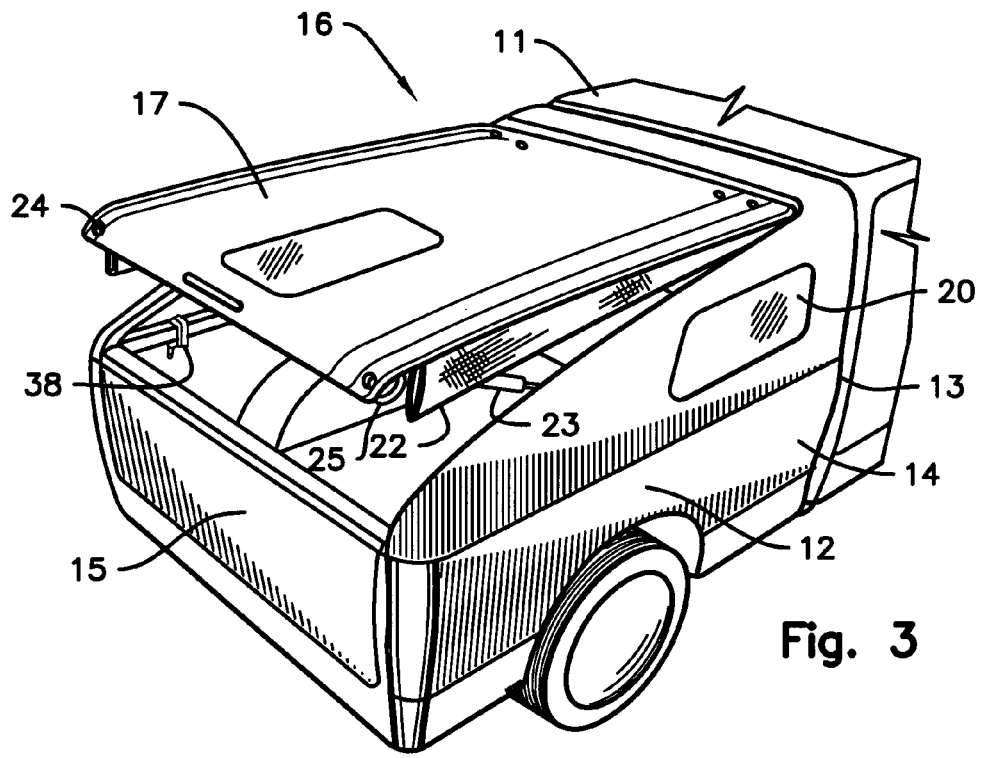
FIG. 3 is a fragmentary perspective view similar to FIG. 1, but illustrating the truck cap in an open roof position.
Figure 4:
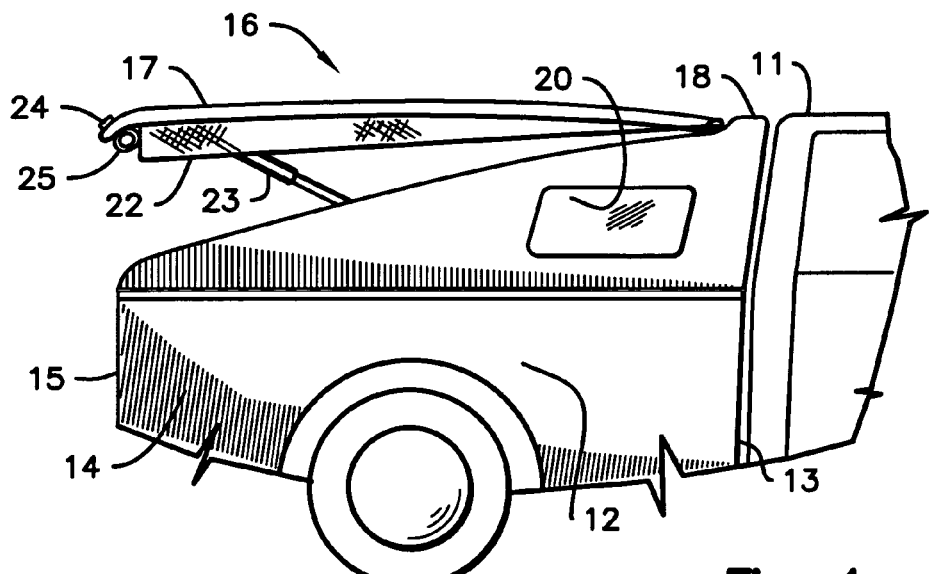
FIG. 4 is a fragmentary, right side elevation view similar to FIG. 2, with the transformable truck cap in an open roof position.

In FIGS. 3 and 4 the cover assembly cover 17 is disposed in the "open roof" position. To lift cover 17, locks 24 are first opened, and the cover 17 is raised from the truck shell 18. Cover 17 is pivotally attached to shell 18 by two-piece hinges 33 disposed at the assembly front (FIG. 8) on the transverse front portion of shell 18. Cover 17 thus rotates upwardly at its front end about hinges 33 adjacent the cab. The rear portion of cover 17 can deflect upwardly relative to the tailgate 15. The truck cap cover 17 can be raised to a position such that it is generally coplanar with the roof of the truck cab 11. Preferably, a pair of hydraulic struts 23 stabilizes panel deflection and enhances and braces the assembly. Fabric side walls 22 and a fabric rear hatch 25 shown in the stowed position in FIGS. 3 and 4 are secured beneath cap cover 17 and may be deployed as hereinafter explained when the assembly 16 is to assume the "fully transformed" position of FIGS. 5 and 6.

Figure 5:
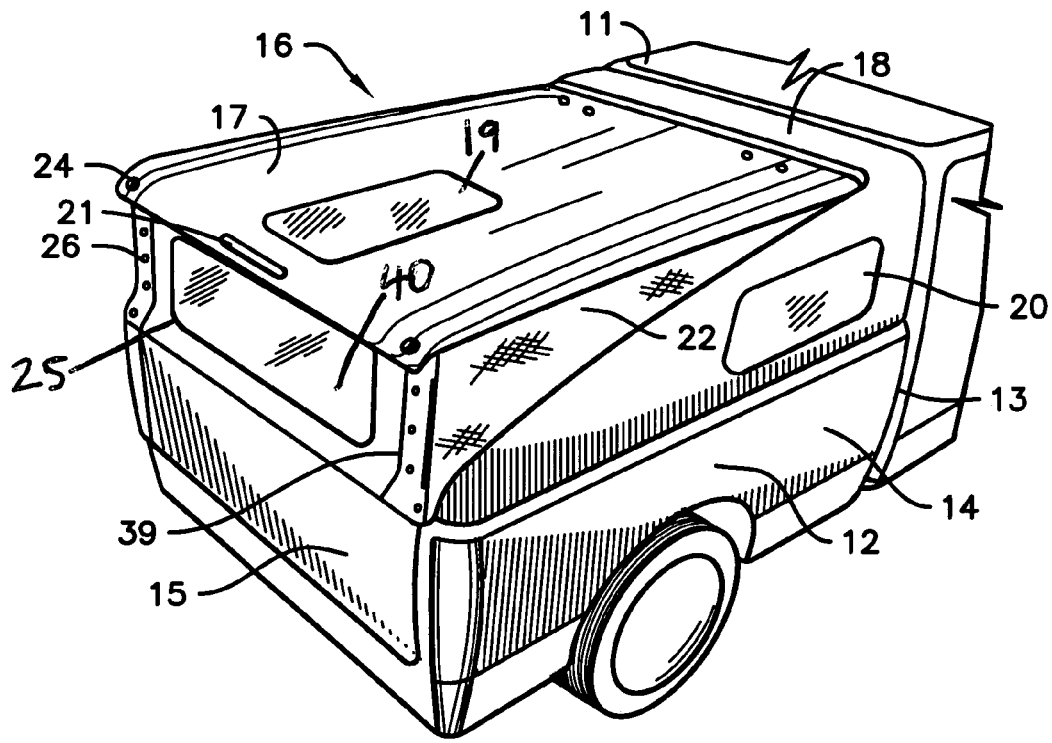
FIG. 5 is a fragmentary perspective view similar to FIG. 3, with the transformable truck cap shown fully deployed in a transformed position.
Figure 6:
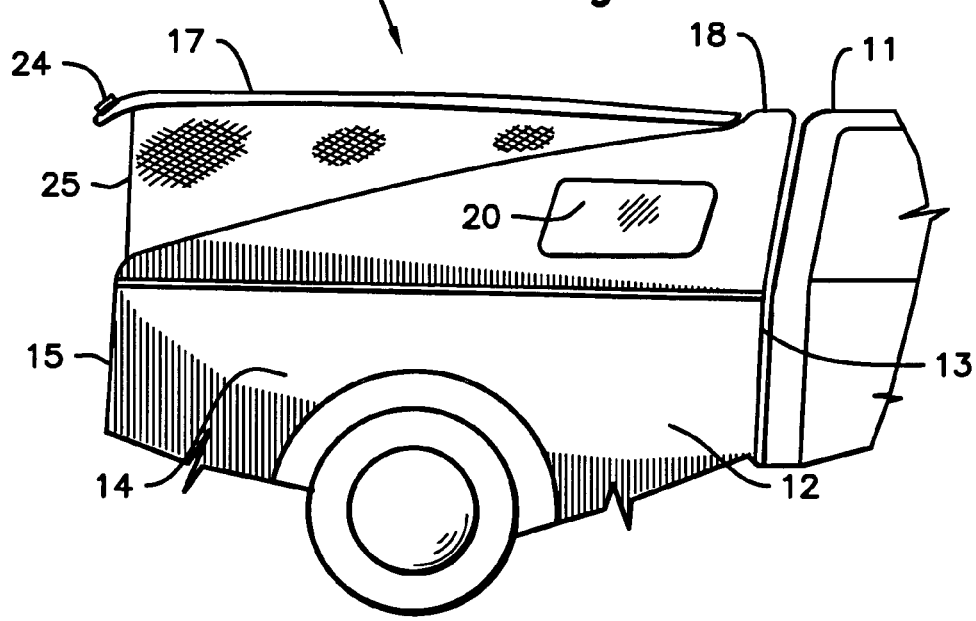
FIG. 6 is a fragmentary, right side elevation view similar to FIG. 4, with the transformable truck cap fully deployed, disposed in a transformed position.

The cover assembly 16 is illustrated in a fully transformed position in FIGS. 5 and 6. The preferably flexible, bi-folded fabric side walls 22 are lowered along with the unfurled fabric rear hatch 25 and secured. Preferably rear hatch 25 comprises a clear vinyl, flexible rear window 40 for enhanced visibility. The rearward ends of the fabric side walls 22 are secured into place by a plurality of spaced-apart snap caps 26 with the fabric rear hatch 25 being releasably attached to the fabric side walls 22 by conventional zippers 39. The structures to which snap caps 22 are affixed, and other preferred internal framework of the cover assembly 16, are explained in conjunction with the discussion of FIGS. 8 and 9 appearing below.

Figure 7:
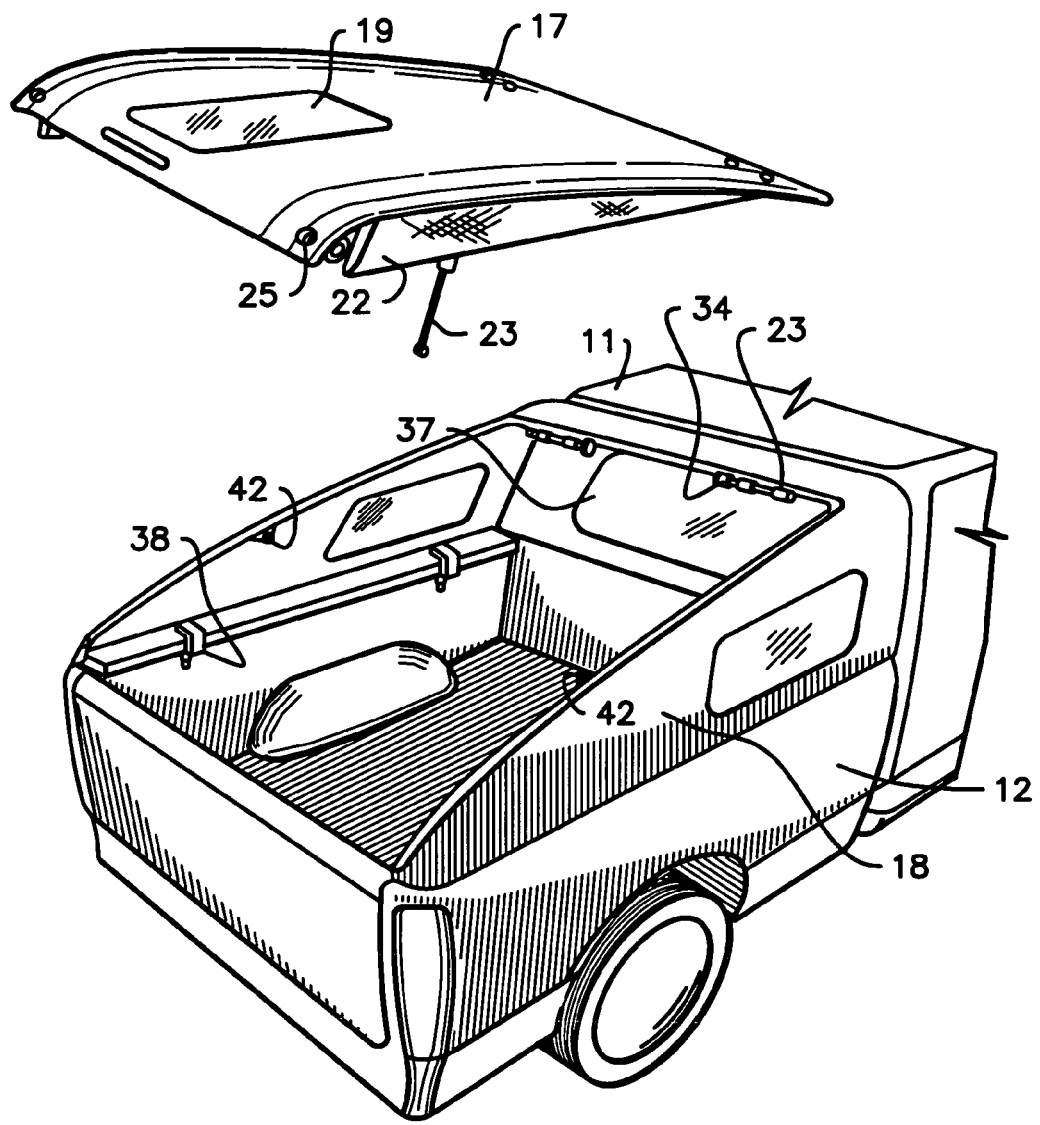
FIG. 7 is a partially exploded, fragmentary perspective view showing the truck cap removed from the truck bed.

In FIG. 7 cover 17 is shown in a "removed position" wherein it is completely disconnected and separated from the framework of assembly 16. Cap cover 17 is selectively user detached from the truck cap body 18 by first disconnecting the lower ends of the hydraulic stabilizer struts 23 (i.e., FIGS. 3, 7) from ball studs 42 formed in the side edges of the body 18 (FIG. 7). The upper ends of struts 23, are detachably connectable to upper ball studs attached to fabric side wall hanger 30.

Next, hinges 33 (FIG. 8) at the front of cover 17 are disassociated by removing quick release pins 34 from the two piece hinge structure, that includes halves permanently secured to the truck cap body 18 and to the underside of cover 17. Truck cap body 18 remains attached to truck bed 12, affixed by clamps 38 secured to the upper edges lip portions of the truck bed side panels 18 (i.e., FIG. 7). Body 18 has a safety glass window 37 (FIG. 7) is present for rearward visibility. As best seen in FIG. 7, the rear hatch 25 and the side walls 22 attached beneath opposite sides of cap cover 17, can remain in a compact stowed position upon removal of cover 17.

Figure 8:
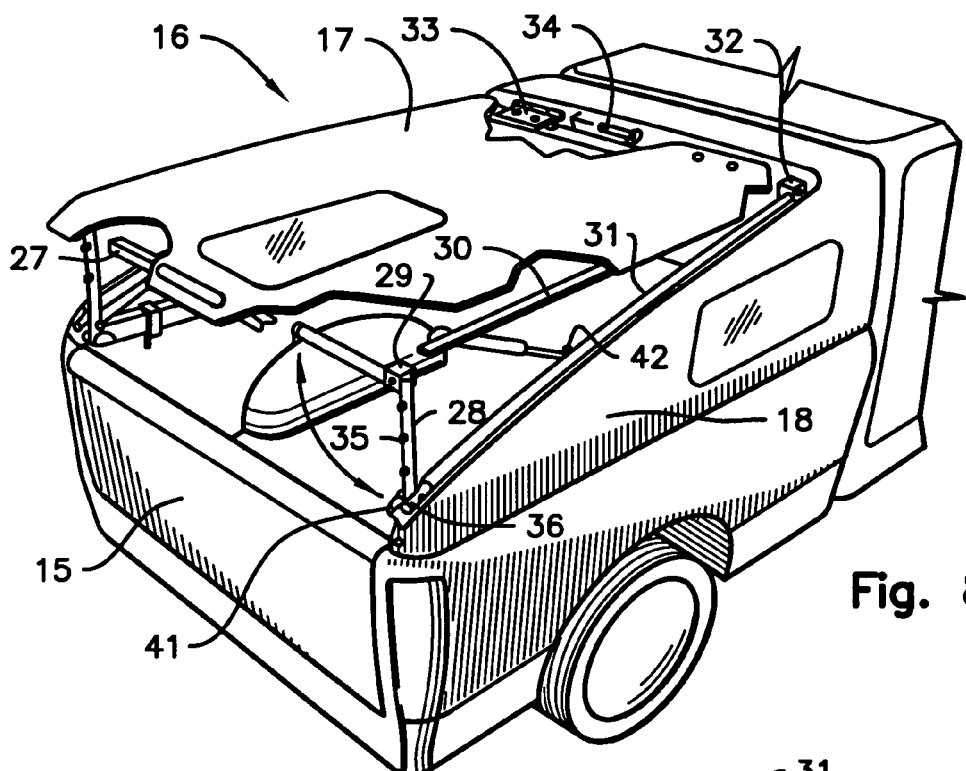
FIG. 8 is a fragmentary perspective view with cutaway sections showing how the framework appears and showing interrelationships of frame members with the transformable truck cap roof; and, FIG. 9 is an enlarged fragmentary perspective view of portions of the supporting framework, with portions omitted for brevity or shown in section for clarity.
Figure 9:
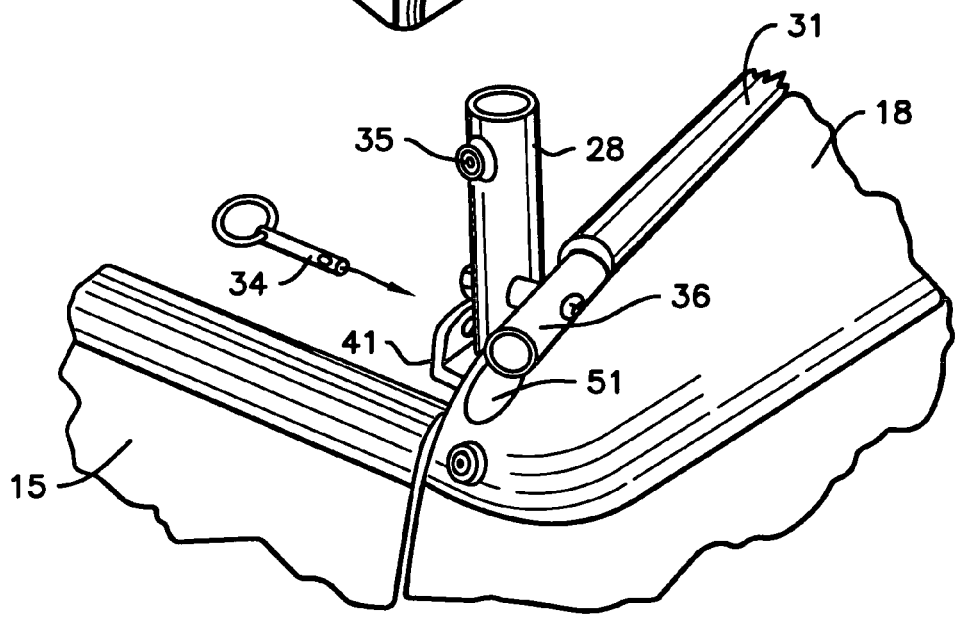

In FIGS. 8 and 9 the preferred framework that operationally mounts the cover assembly 16 within the truck bed is detailed. An elongated hatch hanger 27 is permanently transversely attached beneath the rear surface of cover 17, and it is preferably glassed into the cover undersurface. Hanger 27 mounts and/or stows the flexible rear hatch 25 beneath the rear of cover 17.

A pair of pivoted stanchions 28 (FIG. 8) are deployed to support the panel in the elevated configuration. Stanchions 28 can be rotated to assume a position generally parallel with the tailgate 15. Each stanchion 28 pivotally terminates in an upper bracket 29 which is permanently attached to the cover 17, being glassed into the undersurface thereof. Brackets 29 (FIG. 8) provide vertical support for the cover 17 when it is deployed in the elevated position of FIGS. 5 and 8. Preferably the lower ends of stanchions 28 are permanently pivoted to tube stubs 36 that coaxially fit into the rear ends of sleeve tubes 31 (FIGS. 8, 9). Downward displacement of the cover 17 and stanchions 28 is limited by a pair of supporting keepers 41 (FIGS. 8, 9), which are attached to the inside surface of the triangular sides of cap body 18. This adjustability provided by the previously mentioned structure allows the host pickup truck to transport cargo greater in height than the roof of the truck cab 11.

The flexible side walls 22 are supported by rigid, extruded aluminum hangers 30 attached to cover 17. Wall hangers 30 are preferably glassed into the underside of cover 17. A pair of lower side wall sleeve tubes 31, when deployed, secures the bottoms of the side walls 22 by penetrating a loop formed in the fabric bottom. Sleeve tubes 31 are attached at their fronts to the underside of removable cover 17, by U-shaped brackets 32 (FIG. 8) that are preferably permanently attached to the underside of cover 17 and are permanently glassed in. When cover 17 is deployed in the aerodynamic position, supporting sleeve tubes 31 and the cover 17 both extend at an inclination proximate the triangular sides of the body 18 (FIG. 8). Since sleeve tubes 31 are pivotally attached at their fronts to pivotal mounting brackets 32 secured beneath the front of cover 17 (FIG. 8), they both may be adjusted during cover transformation to ease installation. When the cover is raised, flexible side walls 22 are secured at their bottoms, as the sleeve tubes 31 penetrate elongated, lower loops in the wall fabric to hold walls 22 down when the cover 17 is raised. As cover 17 is raised or lowered, the sleeve tube mounting brackets 32 can separately pivot relative to cover 17 because of their brackets 32.

The rear end of each sleeve tube 31 (FIG. 9) can be secured to the body rear by telescoped, rotatable, keeper stubs 36 which are pivotally attached to the lower ends of stanchions 28 (FIG. 9). The outer diameter of the rotational stubs 36 is slightly smaller than the inside diameter of the open end of the sleeve tubes 31, allowing adjustable coupling. Stanchions 28 are permanently pivoted to the underside of cover 17. The lower ends of stanchions 28 are then positioned upon the lower keeper brackets 41 (FIG. 9) which support the assembly. Quick release pins 34 removably couple stanchions 28 to keeper brackets 41. Suitable lower orifices in the stanchions 28 register with holes in the keeper brackets 41 to allow correct positioning and securement of the pins 32. In this manner the cover 17 is removably yet securely attached to the body 18 when elevated. Snap cap buttons 35 are affixed to stanchions 28 to secure the rearward ends of the side walls 22 which contain snap caps 26.

Operation

To raise the cover 17 from the closed aerodynamic position of FIGS. 1 and 2 to the raised, open roof position of FIG. 8, the user may first unfasten locks 24 (i.e., FIG. 3). With the subsequent manual application of upward pressure to the rear of cover 17 adjacent tailgate 15, lifting follows against slight resistance form stabilizer struts 23. Cap cover 17 rotates about hinges 33 (FIG. 8) and can thus be moved to a height the approximate level of the roof of the truck cab 11 (i.e., FIGS. 3, 4). The two piece hinges 33 include a portion permanently attached to and glassed into cover 17, and complementary portions permanently attached to the body 18. Pins 34 releasably, pivotally couple the hinge portions together. When the cover 17 is disposed in its aerodynamic position, or if it is completely removed from the assembly as in FIG. 7, the rear hatch 25 and the side walls 22 can remain in the unfurled stowed position beneath cover 17. When desired they are unfurled and deployed in position with zippers 39 and snap caps 25 discussed above.

To raise the assembly 16 from the aerodynamic position of FIGS. 1 and 2 to the raised open roof position of FIGS. 3 and 4, the user should connect the rear ends sleeve tubes 31 to the keeper stubs 36 that are coaxially fitted into the open rear ends of the lower sleeve tubes 31 (FIG. 9). Stubs 36 are permanently pivoted to the bottoms of stanchions 28. The stanchions 28 can then be releasably attached to brackets 41 (FIG. 9) by pins 32 (FIG. 9). The lower ends of stanchions 28 supported upon keeper brackets 41 are secured with quick release pins 34. The user first foldably deploys the nested or retracted stanchions 28 from their previous stowed positions beneath cover 17. As cover 17 is raised along with the captivated tubes 31, the side walls 22 can be unfurled. Ends of the fabric side walls 22 are wrapped around the stanchions 28 and secured with snap caps 26, which are attached to snap cap buttons 35 upon tubular stanchions 28.

The user then unrolls the fabric rear hatch 25 from the stowed position upon hanger 27 located underneath the rear of the truck cap cover 17. Both sides of hatch 25 are coupled to the previously deployed side walls 22 with zippers 39 (FIG. 5). The cover assembly 16 has now undergone the full process to be positioned in the fully transformed configuration. The user is able to operate the host pickup truck at sustained freeway speeds. To return to the closed Aerodynamic position of FIG. 1, the process is reversed.

The user can optionally remove cover 17 from the truck cap body 18 to facilitate the transportation of oversized cargo that, for example, might be higher than the roof of cab 11. First, the user opens the cover 17 as described above, from a closed aerodynamic position to a partially raised roof open position. Once the truck cap cover 17 is in the raised position with the fabric side walls 22 and the fabric rear hatch 25 still in the stowed positions underneath the truck cap cover 17, stabilizers 23 are disconnected from ball studs 42. The user then removes the quick release pins 34 from the hinges 33 (FIG. 8), freeing the cover 17, with the side walls 22, sleeves 31, hanger 37, stanchions 28, and the rear hatch 25 remaining attached to cover 17. The truck cap body 18 remains fastened to the truck bed 12.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A transformable cover assembly for conventional pickup trucks of the type having a cab with a rear cab portion, a rear, a rear cargo bed bounded by sides, and a tailgate, the cover assembly comprising:
    a rigid shell operationally disposed within and semi-permanently attached to said cargo bed, said shell comprising a pair of rigid, spaced apart, generally triangular side walls extending along the sides of said cargo bed, said sidewalls tapering to a reduced height towards said truck rear;
    means for semi-permanently mounting said shell within said bed;
    a rigid, aerodynamic cover adapted to be selectively disposed over said shell for covering said truck bed, said aerodynamic cover having a front and a rear;
    means for pivotally, removably coupling said aerodynamic cover to said shell such that the aerodynamic cover may selectively assume one of the following configurations:
        (A) a sloping aerodynamic configuration for efficient truck travel overlying the shell that provides reduced aerodynamic drag, wherein the aerodynamic cover extends at an inclination from the rear of the cab to the tailgate over said shell;
        (B) a fully deployed, elevated configuration in which said aerodynamic cover is pivoted upwardly relative to said shell and said bed without removing it from said shell to at least temporarily assume a position that is substantially parallel with and vertically spaced above said truck bed to maximize the enclosed truck bed cargo area; and,
        (C) an open truck bed configuration wherein said aerodynamic cover is removed from said shell while said shell remains attached to the truck and the truck bed is open vertically but peripherally bounded by said shell, thereby providing clearance for the transportation upon said bed of cargo greater in height than the roof of the truck cab;
    a pair of flexible sidewalls attached to said aerodynamic cover that are normally stowed beneath said aerodynamic cover and which may be selectively unfurled from said aerodynamic cover on opposite sides thereof to enclose said bed by making contact with said shell sidewalls when said aerodynamic cover is disposed in said fully deployed, elevated configuration;
    a pair of sidewall hangers for suspending the sidewalls, the sidewall hangers attached to the aerodynamic cover;
    a pair of sleeve tubes pivotally attached to said aerodynamic cover that extend towards the truck rear at an incline for deploying the sidewalls, said sleeve tubes having first ends pivotally connected to said aerodynamic cover proximate said truck cab and the sleeve tubes comprising opposite spaced apart ends terminating in coaxially fitted pivot tube stubs;
    a flexible rear hatch attached to said aerodynamic cover rear;
    means associated with said aerodynamic cover for stowing said sidewalls and said rear hatch when said aerodynamic cover is either disposed in said aerodynamic position or removed from said shell;
    a pair of adjustable stanchions pivotally attached to said aerodynamic cover proximate said truck bed rear adapted to be foldably deployed vertically for elevating and supporting the aerodynamic cover when the aerodynamic cover is disposed in said fully deployed, elevated position, said stanchions comprising lower ends and spaced apart upper ends foldably attached to said aerodynamic cover;
    keeper bracket means attached to the inside portions of the triangular sides of said shell for supporting said stanchions and said sleeve tubes, the lower ends of said stanchions being releasably, pivotally pinned to said keeper bracket means;
    means for pivotally coupling said pivot tubes to said lower ends of said stanchions,
    elongated cradles defined atop sides of said shell for selectively receiving and nesting said sleeve tubes when the aerodynamic cover assumes said fully deployed, elevated configuretion; and,
    whereby, when said aerodynamic cover is removed from said shell after unpinning said stanchions from said keeper bracket means, the aerodynamic cover, the sleeve tubes and the stanchions are removed together from said shell by withdrawal of said aerodynamic cover.

2. The cover assembly as defined in claim 1 wherein said sleeve tubes penetrate loop portions of the sidewalls at sidewall bottoms for tensioning them.

3. A transformable cover assembly for conventional pickup trucks of the type having a cab with a rear cab portion, a rear, a rear cargo bed bounded by sides, and a tailgate, the cover assembly comprising:
    a rigid shell operationally disposed within and semi-permanently attached to said bed, said shell comprising a pair of spaced apart, generally triangular sidewalls extending along the sides of said cargo bed, said sidewalls tapering to a reduced height towards said truck rear;
    means for semi-permanently mounting said shell within said bed;
        a rigid aerodynamic cover adapted to be selectively disposed over said shell for covering said said truck bed, said aerodynamic cover having a front and a rear;
    means for pivotally, removably coupling said aerodynamic cover to said shell such that the aerodynamic cover may be pivotally deployed between the following configurations:
        (A) a sloping aerodynamic configuration for efficient truck travel overlying the shell that provides reduced aerodynamic drag, wherein the aerodynamic cover extends at an inclination from the rear of the cab to the tailgate over said shell; and, (B) a fully deployed, elevated configuration in which said aerodynamic cover is pivoted upwardly relative to said shell and said bed without removing it from said shell to at least temporarily assume a position that is substantially parallel with and vertically spaced above said truck bed to maximize the enclosed truck bed cargo area;

a pair of flexible sidewalls attached to said aerodynamic cover that are normally stowed beneath said aerodynamic cover and which may be selectively unfurled from said aerodynamic cover on opposite sides thereof to enclose said bed by making contact with said shell sidewalls when said aerodynamic cover is disposed in said fully deployed, elevated configuration;

a pair of sidewall hangers for suspending the sidewalls, the sidewall hangers attached to the aerodynamic cover;

a pair of adjustable stanchions pivotally attached to said aerodynamic cover proximate said truck bed rear adapted to be foldably deployed vertically for elevating and supporting the aerodynamic cover when the aerodynamic cover is disposed in said fully deployed, elevated postion, said stanchions comprising lower ends and spaced apart upper ends foldably attached beneath said aerodynamic cover;

a pair of sleeve tubes pivotally attached to said aerodynamic cover that extend towards the truck rear at an incline that secure the sidewalls for deployment, said sleeve tubes penetrating portions of the sidewalls at their bottoms for tensioning the sidewalls, and said sleeve tubes having first ends pivotally connected to said aerodynamic cover proximate said truck cab and the sleeve tubes comprising opposite, spaced apart ends terminating in coaxially fitted pivot tube stubs pivotally coupled to said stanchion lower ends;

keeper bracket means attached to inside portions of the shell to which said lower ends of said stanchions may be releasably pivotally pinned;

elongated cradles defined atop sides of said shell for selectively receiving and nesting said sleeve tubes when the aerodynamic cover assembly assumes said fully deployed, elevated configuration; and, whereby, when said aerodynamic cover is removed from said shell after unpinning said stanchions from said keeper bracket means, the aerodynamic cover, the sleeve tubes and the stanchions are removed together form said shell by removing said aerodynamic cover from said assembly.

4. A transformable cover assembly for conventional pickup trucks of the type having a cab with a rear cab portion, a rear, a rear cargo bed bounded by sides, and a tailgate, the cover assembly comprising:

a rigid shell operationally disposed within and semi-permanently attached to said bed, said shell comprising a pair of rigid, spaced apart, generally triangular sidewalls extending from said rear cab portion along the sides of said cargo bed and tapering to a reduced height towards said truck rear;

means for semi-permanently mounting said shell within said bed;

a rigid, frameless aerodynamic cover that is user selectable between either:

(A) a sloping aerodynamic configuration for efficient truck travel overlying the shell that provides reduced aerodynamic drag, wherein the aerodynamic cover front is disposed proximate said rear cab portion and extends at an inclination towards said tailgate over said shell;

(B) a fully deployed, elevated configuration in which said aerodynamic cover is pivoted upwardly relative to said shell and said bed without removing it from said shell to at least temporarily assume a position that is substantially parallel with and vertically spaced above said truck bed to maximize the enclosed truck bed cargo area; or, (C) an open truck bed configuration wherein said aerodynamic cover is removed from said shell while said shell remains attached to the truck and the truck bed is open vertically but peripherally bounded by said shell, thereby providing clearance for transportation upon said bed of cargo greater in height than the roof of the truck cab; and, said aerodynamic cover comprising:
a front;
a rear;
a top;
a bottom;
a pair of sidewalls;
a pair of sleeve tubes pivotally coupled to said aerodynamic cover bottom that extends towards the truck rear at an incline that secures the sidewalls for deploying the sidewalls, said sleeve tubes having first ends pivotally connected to said aerodynamic cover bottom proximate said truck cab and the sleeve tubes comprising opposite, spaced apart ends terminating in pivot tube stubs;

a flexible rear hatch attached to said aerodynamic cover rear;

a pair of adjustable stanchions pivotally attached to said aerodynamic cover bottom proximate said truck bed rear adapted to be deployed vertically for elevating and supporting the aerodynamic cover to selectively deploy the aerodynamic cover in said elevated position, said stanchions comprising lower ends and spaced apart upper ends foldably attached to said aerodynamic cover bottom;

keeper bracket means attached to inside portions of the triangular sides of said shell for supporting said stanchions and said sleeve tubes, the lower ends of said stanchions releasably, pivotally pinned to said keeper bracket means, and said pivot tube stubs pivoted to said lower ends of said stanchions;

elongated cradles defined atop sides of said shell for selectively receiving and nesting said sleeve tubes when the aerodynamic cover assumes said fully deployed, elevated configuration; and, whereby, when said aerodynamic cover is removed from said shell after unpinning said stanchions from said keeper bracket means the aerodynamic cover, the sleeve tubes and the stanchions are removed together from said shell by withdrawal of said aerodynamic cover to completely expose said truck bed.

* * * * *